United States Patent [19]

Illetschko

[11] 3,798,353

[45] Mar. 19, 1974

[54] CORRECTING VERTICAL RESOLUTION IN TELEVISION COLOR IMAGES

[75] Inventor: Gerhard Illetschko, Darmstadt, Germany

[73] Assignee: Fernseh GmbH, Darmstadt, Germany

[22] Filed: Oct. 28, 1971

[21] Appl. No.: 193,886

[30] Foreign Application Priority Data

Oct. 31, 1970 Germany.......................... 2053513

[52] U.S. Cl. .......................... 178/5.4, 178/DIG. 25
[51] Int. Cl. .......................................... H04n 5/14
[58] Field of Search ............................ 178/DIG. 25

[56] References Cited

UNITED STATES PATENTS

| | | | |
|---|---|---|---|
| 3,549,901 | 12/1970 | Ross et al. | 178/DIG. 25 |
| 3,333,059 | 7/1967 | Davidse | 178/DIG. 25 |
| 3,536,826 | 10/1970 | McMann, Jr. | 178/DIG. 25 |

OTHER PUBLICATIONS

McMann, Jr. et al., – Improved Signal Processing Techniques for Color Television Broadcasting, – March 1968, – SMPTE, – Vol. 77, pp. 221–228.

*Primary Examiner*—Robert L. Griffin
*Assistant Examiner*—Joseph A. Orsino, Jr.
*Attorney, Agent, or Firm*—Littlepage, Quaintance, Murphy & Dobyns

[57] ABSTRACT

A luminance signal is formed by adding an undelayed color signal and a delayed color signal. A chrominance signal is formed by subtracting the undelayed and delayed signals. A low frequency component in the chrominance signal is removed and is added to the luminance signal as a correction signal.

14 Claims, 10 Drawing Figures

CORRECTING VERTICAL RESOLUTION IN TELEVISION COLOR IMAGES

BACKGROUND OF THE INVENTION

The invention relates to a method and an arrangement for increasing the resolution in the vertical direction in a color television image, in particular for the purpose of avoiding resolution loss caused by linear combining of the color signal which is delayed by one or more line periods and of the undelayed color signal, for separating the luminance signal and the chrominance signal of the color signal.

The splitting up of a color signal into the luminance signal and the chrominance signal by linear combining of the color signal which is delayed by one or more line periods and of the undelayed color signal, by means of so-called comb filters, results in a separation between luminance signal and chrominance signal in the entire frequency range of the color signal. However, this advantageous property of the comb filter has the disadvantage, on the other hand, that due to the luminance signal being composed of a delayed color signal and an undelayed color signal, a "haziness" or poor definition, of the image, occurs in the vertical direction.

For this reason, therefore, up to now it has been preferred to use a splitting-up of the color signal, according to the frequency, into a higher-frequency part in the range of the chrominance signal, and a low-frequency luminance signal part; and to put up with the resolution loss thereby involved, in the horizontal direction, and the "cross-talk" distortion in the higher-frequency luminance signal parts in the chrominance signal.

SUMMARY OF THE INVENTION

The invention is based upon the discovery that from the chrominance signal or its components of a comb filter, a correction signal can be derived, which removes the resolution loss in the vertical direction of a color television image.

The present invention increases the resolution in the vertical direction of a color television image and in particular avoids the resolution loss, which is caused by linear combining of the color signal which is delayed by one or more line periods, and the undelayed color signal. According to the invention the vertical parts of the luminance signal which, with the linear combination with different signal content, appear in successive line periods, after removal of the chrominance signal parts are added to the luminance signal as a correction signal.

The method in accordance with the invention is applicable in the currently introduced color television systems, wherein the color image signal is formed from a luminance signal and a carrier-frequency chrominance signal, which is additively superimposed on the luminance signal; and the color carrier is so selected that the spectrum lines of one part of the signal fall in the gaps between the spectrum lines of the other part of the signal, and the separation between luminance signal and chrominance signal takes place by means of a comb filter. The method according to the invention is of particular importance in the PAL color television system, wherein, for the separation between the luminance signal and chrominance signal, it is necessary to have a comb filter with a delay of two line periods of the color signal, and therefore a considerable resolution loss occurs in the vertical direction.

BRIEF DESCRIPTION OF THE DRAWINGS

Now the invention will be explained on the basis of the attached figures of drawings, which represent circuit arrangements for working the method in accordance with the invention. The drawings show:

In FIG. 1, the color signal FBAS of the NTSC standard is conveyed to the arrangement and, in the delaying device 1, is delayed by one line period H. The delayed color signal, with the undelayed color signal, are subtractively and additively put together in the devices 3 and 4. From the difference between the delayed and the undelayed signal, there is obtained the chrominance signal with double amplitude $2Cr$; the sum of the two signals represents the luminance signal with double amplitude 2Y.

FIG. 2 shows the behaviour of this circuit arrangement, thus far known, at the occurrence of a vertical frequency signal step. This appears in contrast to the undelayed signal $A_1$ at the input of the circuit arrangement, at the output of the delaying device 1, delayed by one line period $H(B_1)$. From FIG. 2 it can be seen that the luminance signal, formed by addition of the two signals $A_1$ and $B_1$, with double amplitude, is composed of two parts, displaced in time by one line period; and therefore that the signal step is widened by one line period which corresponds to a resolution loss in the vertical direction.

In order to avoid this integration loss, the low frequency luminance signal appearing in the chrominance signal at the occurrence of a vertical-frequency signal step is taken from the differential signal $D_1$ by means of a low-pass filter 5 and is added to the luminance signal $C_1$ in the addition stage 12, as the correction signal K. As can be seen from FIG. 2, thereby the integration loss in the luminance signal is compensated, and in the luminance signal $2Y_K$ the signal step appears at the same time, and with the same steepness of flanks, as the signal step in the output signal $A_1$.

Figure 1:
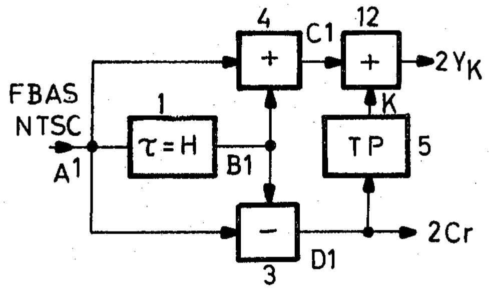
FIG. 1 is the basic circuit arrangement for working the method in accordance with the invention, for NTSC color image signal.
Figure 3:
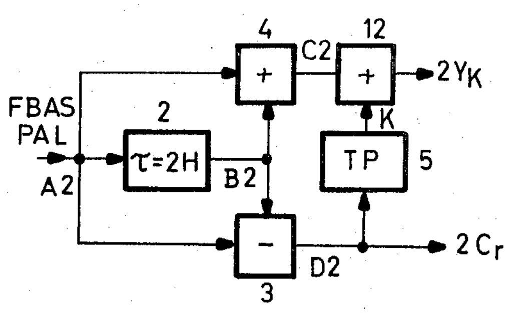
FIG. 3 illustrates the basic circuit arrangement for a PAL color image signal.

FIG. 3 shows the corresponding circuit arrangement as in accordance with FIG. 1, for a PAL color signal. Since, in this case, because of the line by line phase position changes of the chrominance signal, and because of the color carrier offset used, in the gaps between the spectrum lines of the luminance signal, in each case two spectrum lines of the chrominance signal appear spaced at the distance of a quarter-line period for the neighboring spectrum lines of the luminance signal, it is necessary to have a delay by two line periods 2H, for obtaining the luminance signal and the chrominance signal by addition and subtraction of the undelayed and of the delayed color signal.

Figures 2, 4:
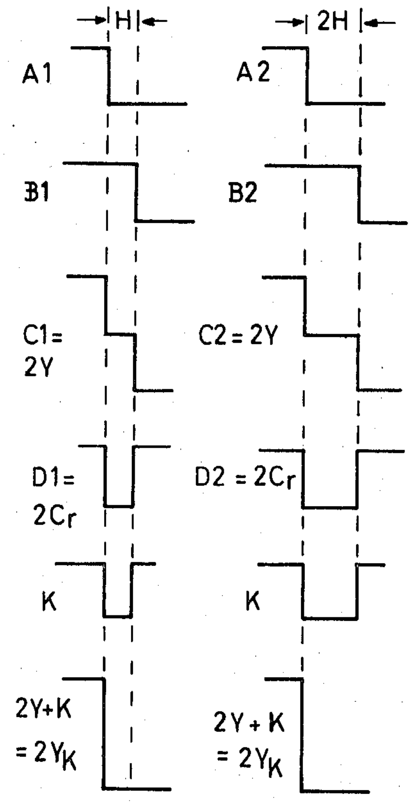
FIG. 2 shows the method of operation of the circuit arrangement in accordance with FIG. 1 at the appearance of a vertical-frequency signal jump.
FIG. 4 shows the method of operation of the circuit arrangement in accordance with FIG. 3.

As FIG. 4 shows, the signal step $C_2$ in the luminance signal now extends over two line periods, which has for its consequence a correspondingly large integration loss. This can be avoided in the same manner as in the circuit arrangement in FIG. 1, by addition, in the addition stage 12 of the low-frequency luminance signal part contained in the chrominance signal to the summation signal.

Figure 5:
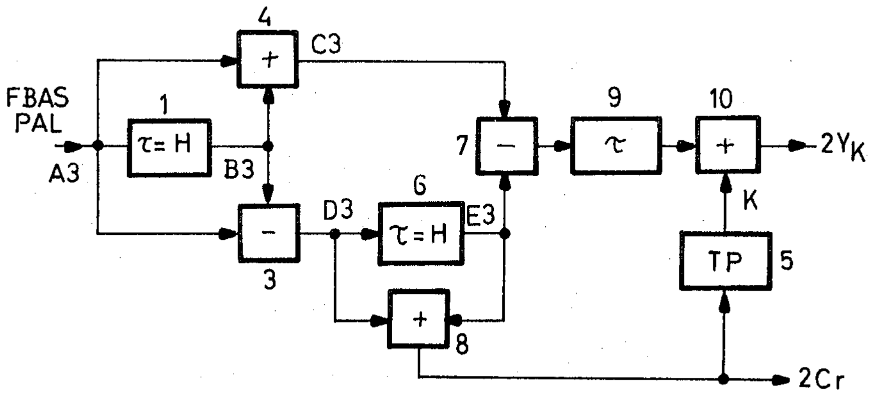
FIGS. 5, 6 and 7 are practical realizations of circuit arrangements for a PAL color image signal.

FIG. 5 shows the use of the method in accordance with the invention with the practical embodiment of a comb filter for a PAL color image signal. The delay of a total of two line periods, necessary for this, here takes place in two stages with one line period in each case. In the first delay line 1, with line duration, the composite color signal FBAS is delayed by one line period. The differential signal and the summation signal are formed in the subtraction stage 3 and the addition stage 4.

FIG. 8 shows again the signal forms thereby appearing. A vertical signal step $A_3$ appears at the input of the circuit arrangement. $B_3$ is the signal delayed by one line period, and $C_3$ is the summation signal. $D_3$, the differential signal, is delayed by a further line period in the delay line 6; producing the signal $E_3$.

By forming the difference in the signals $C_3$ and $E_3$ in the subtraction stage 7 the luminance signal 2Y is produced, which again is composed of two parts displaced in relation to one another by two line periods. By forming the sum of the signals $D_3$ and $E_3$, the addition stage 8 produces the chrominance signal with double amplitude 2C*r*. The low frequency luminance signal components contained in the chrominance signal at the occurrence of a vertical signal jump are separated again by means of a low-pass filter 5 and form the correction signal which is added to the luminance signal in an addition stage 10. In this way a corrected luminance signal 2Y is obtained, in which the signal step corresponds to the signal step $A_3$ in the input signal, as regards its position in time and form.

It is common to the circuit arrangements according to FIGS. 1, 3 and 5 that the correction signal is derived from the chrominance signal limiting the frequency band with a low-pass filter 5, and that the correction signal is added to the luminance signal. The step in the corrected luminance signal then shows, as was already mentioned, approximately the same position in time, and the same form, as the step in the original color image signal.

Figure 6:
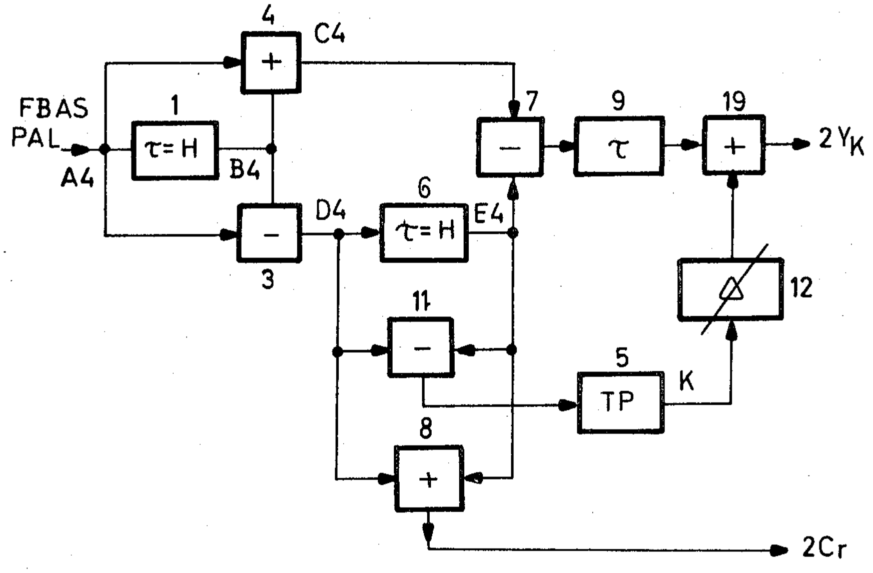
Figure 7:
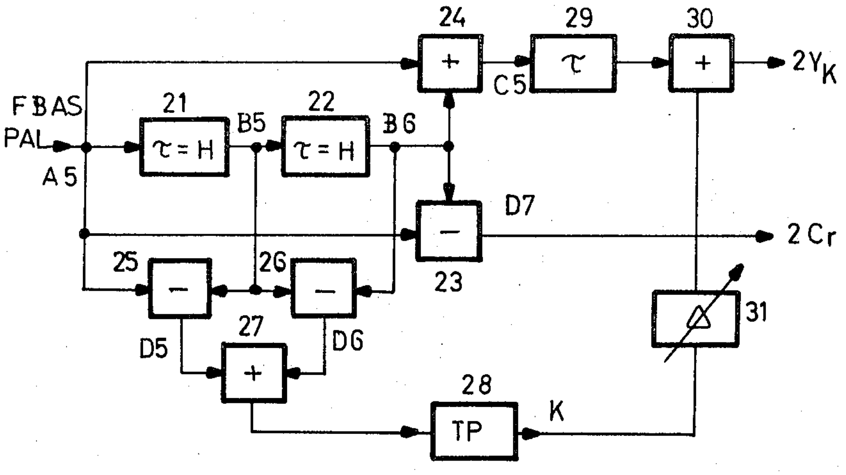

In the circuit arrangements in accordance with FIGS. 6 and 7, this now is only partially the case. Here too a complete compensation takes place of the resolution loss in the vertical direction in the luminance signal, which is caused by the luminance signal being composed of signal parts with different position in time. However, the signal step is displaced by one line period in relation to the signal step in the original color image signal. Over-compensation of the integration loss makes possible an additional increase of the resolution in the vertical direction of resolution loss in the color signal which occurs due to other reasons. An arrangement which is known as "vertical aperture correction"; this will be explained hereinafter in greater detail.

Figure 8:
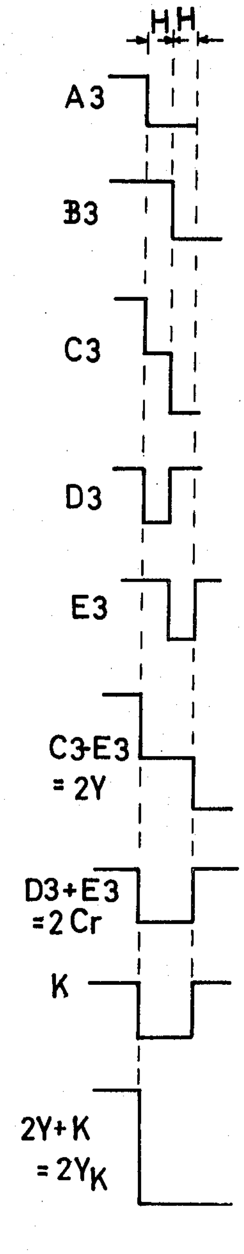
FIGS. 8, 9 and 10 the signal forms which appear in a vertical-frequency signal jump in the circuit arrangements in accordance with FIGS. 5, 6 and 7; for the purpose of explaining the mode of working of these circuit arrangements.
Figure 9:
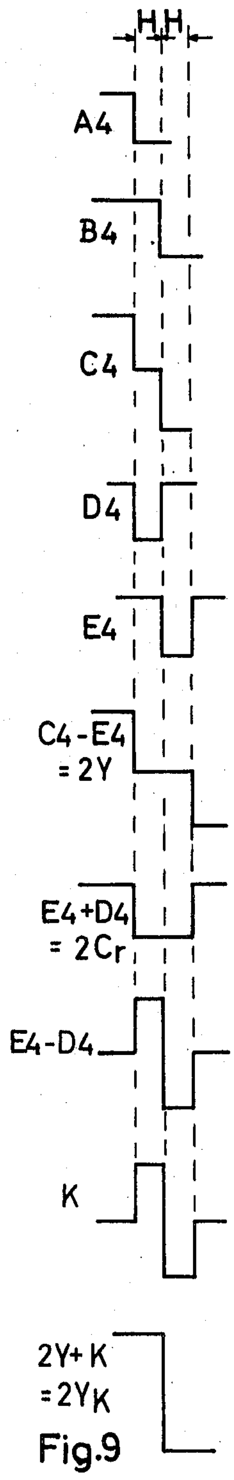

The circuit arrangement in accordance with FIG. 6 largely corresponds — as regards the formation of the luminance signal and of the uncorrected chrominance signal — to the circuit arrangement in accordance with FIG. 5, as can be seen from a comparison of the two circuit arrangements and of the FIGS. 8 and 9. However, in contrast to FIG. 5, the correction signal is not derived out of the chrominance signal which is formed by forming the sum of the differential signal $D_4$ and of the differential signal $E_4$ which is delayed by a further line period. On the contrary the correction signal is formed from the difference between the two aforementioned signals $D_4$ and $E_4$, which is formed in the subtraction stage 11.

FIG. 9 shows the signal forms thereby produced. In the differential signal $E_4$ and $D_4$ the signal step appears with double amplitude, as in the input signal, but delayed by one line period in relation thereto. The correction signal K, derived out of this differential signal by means of the low-pass filter, has the same form. If the signal K is added to the uncorrected luminance signal 2Y, then, in the corrected signal, as can be seen from FIG. 9, the signal step likewise is delayed by one line period in relation to the signal step in the original color image signal. However, the corrected luminance signal has the same voltage behaviour as the input signal. Because of the delaying of the corrected luminance signal in relation to the part of the luminance signal at the input of the circuit, there is no longer any necessity for an additional transit time adaption of the luminance signal to the chrominance signal.

A further advantage consists, as was already mentioned, in that if the amplitude of the correction signal is increased in relation to the amount which is necessary for compensation of the integration loss due to the signal delay, it is possible additionally to obtain an improved resolution in the vertical direction. In order to enable optional adjustment of this over-compensating, in the circuit arrangement in accordance with FIG. 6 there is provided, in the path of the correction signal, an adjustment possibility, for example, a variable control 13 for controlling the amplitude of the correction signal which is added to the uncorrected luminance signal in the adder stage 19.

Finally, FIG. 7 shows a circuit arrangement of a somewhat different construction having a comb filter for a PAL color image signal and a correcting device in accordance with the method according to the invention. Similarly to what is the case in the principal circuit arrangement in accordance with FIG. 3, the PAL color signal which is led to the arrangement is delayed by two line periods. By addition and subtraction of the delayed color signal, and of the undelayed color signal, in the addition stage 24, and in the subtraction stage 23, the luminance signal and the chrominance signal are formed with double amplitude.

Figure 10:
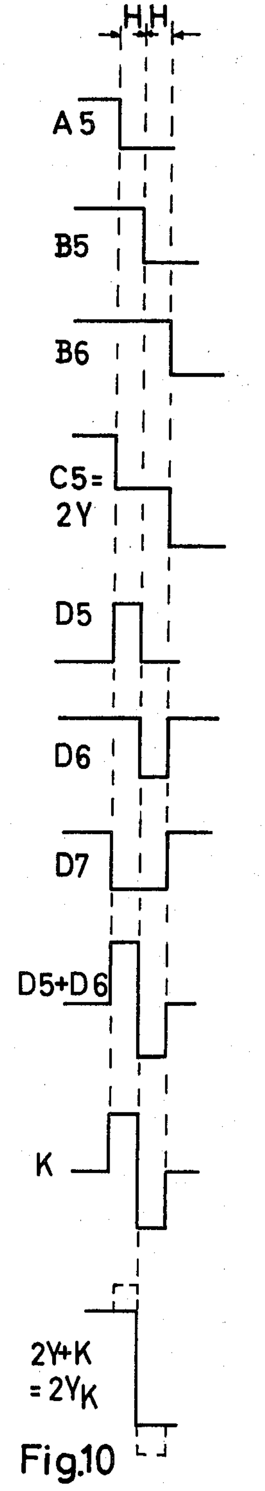

FIG. 10 shows the signal forms thereby produced. The delaying by two line durations takes place in two stages by means of two series connected delay lines 21 and 22, with a delay duration of one line period in each case. The correction signal is derived out of the once and twice delayed color signal and the undelayed color signal in the following manner. In the subtraction stages 25 and 26, the difference of the color signal which is delayed by one line period and the difference of the color signal which is delayed by two line periods and the color signal which is delayed by one line period are formed. The differential signals $D_5$ and $D_6$ are produced. From these differential signals there is formed, in the adder 27, the summation signal $D_5 + D_6$, which has the form shown in FIG. 10. By band limiting with the low-pass filter 28, there is produced from the summation signal the correction signal K. If necessary, K is passed through a device 31, for altering its amplitude before being added to the luminance signal in the addition stage 30. Time delay 29 is positioned before the adder in the luminance circuit in a manner similar to delays in the circuits of FIGS. 5 and 6.

If no over-compensation is required, for correction of additional resulution losses, in the vertical direction, then the amplitude controls 13 and 31 in FIGS. 6 and 7 can be dispensed with.

The circuit arrangements described hereinabove are merely examples of embodiment, for explanation and for practical realization of the method in accordance with the invention. This also can be worked in other manner by means of arrangements lying within the scope of the expert's knowledge.

While the invention has been particularly shown and described with reference to a preferred embodiment thereof, it will be understood by those skilled in the art that various changes in form and details may be made therein without departing from the spirit and scope of the invention.

What is claimed is:

1. A method for increasing resolution in a vertical direction of a color television image having a vertical signal frequency by avoiding resolution loss which is caused by linear combining of a color signal which is delayed by one or more line periods and an undelayed color signal, comprising the steps of:

A. separating the color signal into a luminance signal component and a chrominance signal component, wherein the chrominance signal component includes a low-frequency luminance component corresponding to the vertical signal frequency when successive lines of the picture have different signal content, B. deriving the low-frequency luminance signal component from the chrominance signal component and C. adding the derived low-frequency luminance signal component as a correction signal to the separated luminance signal component.

2. A method according to claim 1 wherein the deriving step comprises taking the correction signal from the chrominance signal by band limiting.

3. A method in accordance with claim 2 for use with color signals according to NTSC system, further comprising the step of deriving the difference between an undelayed chrominance signal and a color signal which is delayed by one line period to obtain thereby a difference signal which is a chrominance signal, said correction signal being derived from the difference signal.

4. A method in accordance with claim 2 for use with color signals according to a PAL system, further comprising the step of deriving the difference between a color signal which is delayed by one line period and a color signal which is delayed by two line periods to obtain thereby a difference signal which is said chrominance signal component, said correction signal being derived from the difference signal.

5. A method in accordance with claim 1, for use with color signals according to a PAL system, further comprising the step of deriving, as a first difference signal, the difference between a color signal which is delayed by one line period and an undelayed color signal, adding the first difference signal and a second difference signal which is delayed by one line period with respect to the first difference signal for obtaining a chrominance signal, summing an undelayed color signal and said color signal which is delayed by one line period to derive a summation signal, deriving a third difference signal representing the difference between the summation signal and the second difference signal for use as the luminance signal, wherein the correction signal is derived by the additional step of subtracting the first difference signal from the second difference signal.

6. The method in accordance with claim 1 for color signals in accordance with a PAL system, comprising the steps of adding and subtracting a color signal which is delayed by two line periods and an undelayed color signal to obtain respectively the luminance signal component and the chrominance signal component, forming differences between a color signal which is delayed by one line period and an undelayed color signal, forming differences between a color signal which is delayed by two line periods and a color signal which is delayed by one period, summing the two said differences, and taking a correction signal from a summation signal resulting from the summing of the two differences.

7. The method in accordance with claim 1, comprising the further step of adjusting amplitude of the correction signal.

8. Apparatus for correcting vertical resolution in television color images comprising a source of color signals, a delay line connected to the source, a first adder connected to the source and to the delay line, subtracting means connected to the source and to the delay lines for forming a difference between an undelayed color signal and a delayed color signal, chrominance signal output means connected to the subtracting means for yielding a chrominance signal, a low pass filter connected to the subtracting means, and a second adder connected to the first adder and to the low pass filter for adding signals from the low pass filter and the first adder, thereby producing corrected luminance signals.

9. The apparatus of claim 8 wherein the subtracting means comprises a first subtractor, a second delay connected thereto and a third adder connected to the first subtractor, to the second delay and to the chrominance output for adding a difference of a delayed and undelayed signal and a delayed signal of the difference, and thereby producing a chrominance signal and further comprising a second subtractor connected to the second delay and to the first adder and a third time delay connected between the second subtractor and the second adder.

10. The apparatus of claim 9 wherein the low pass filter is connected between the third adder and the second adder.

11. The apparatus of claim 9 wherein the subtracting means further comprises a third subtractor connected in parallel between the second delay and the third adder, and wherein the low pass filter is connected between an output of the third subtractor and the second adder.

12. The apparatus of claim 11 further comprising a variable amplitude control between the filter and second adder.

13. The apparatus of claim 8 wherein the delay line comprises first and second series-connected delays wherein the subtracting means comprises a first subtractor having inputs connected to an output of the delay line and to the source, and having an output connected to the chrominance signal output, second and third subtractors having inputs respectively connected in parallel to the first and second delays, a third adder connected to outputs of the second and third subtractors, wherein the low pass filter is connected between an output of the third adder and an input of the second adder, and further comprising a third delay connected between the first and second adders.

14. The apparatus of claim 13 further comprising an amplitude control connected between the low pass filter and the second adder.

* * * * *